July 29, 1969     V. P. ROMEO     3,458,072
AUTOMATIC BOARD UNLOADER
Filed Aug. 22, 1967     3 Sheets-Sheet 1
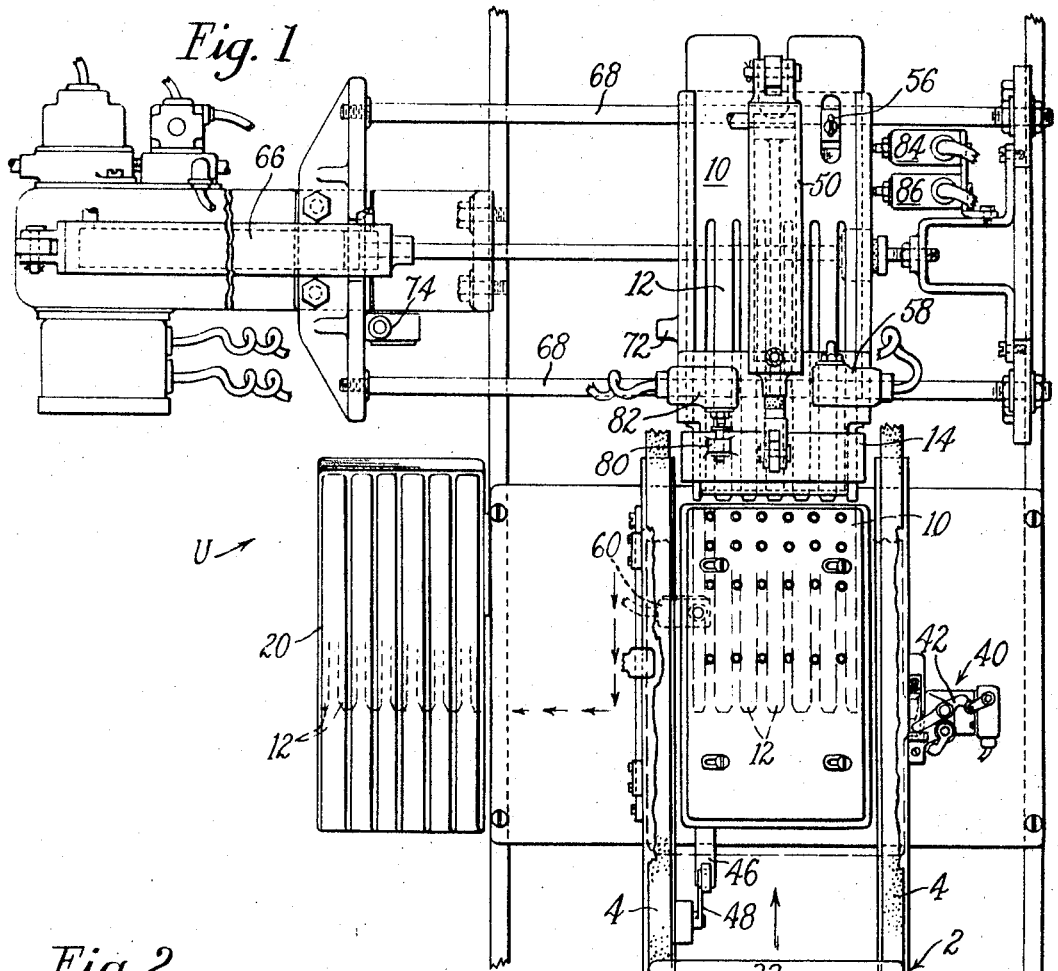
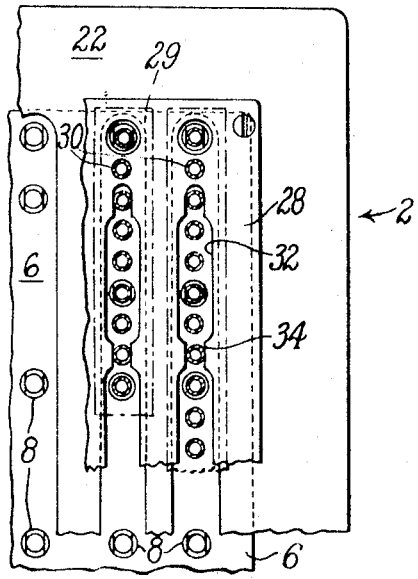
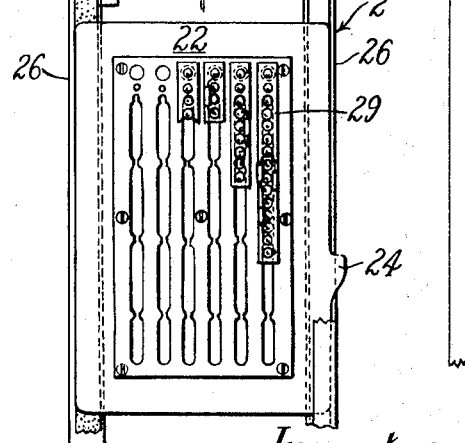
Inventor:
Vincent P. Romeo
By his Attorney
Richard A. Wise

United States Patent Office 3,458,072
Patented July 29, 1969

3,458,072
AUTOMATIC BOARD UNLOADER
Vincent P. Romeo, Danvers, Mass., assignor to USM Corporation, Flemington, N.J., a corporation of New Jersey
Filed Aug. 22, 1967, Ser. No. 662,506
Int. Cl. B65g 65/04, 47/90; H01r 9/00
U.S. Cl. 214—310                                        2 Claims

ABSTRACT OF THE DISCLOSURE

A device for automatically removing a plurality of terminal strips of components of irregular length from a pallet which has transported them through a multi-station electronic component assembly apparatus. The device lifts the strips from the pallet and moves them transversely of the assembly apparatus before releasing them, keeping the strips in the same relative positions, thus allowing easy separation regardless of the relative lengths of strips and/or sizes of the components mounted upon the strips.

BACKGROUND OF THE INVENTION

This invention relates to a machine for automatically removing terminal strips of components (electrical or the like) from pallets. The device is generally adapted to be used with a multi-station conveyor system for assembling electronic components as disclosed in U.S. Patent No. 2,772,416 granted to Dorosz et al. This assembly system has been used in the past to insert a plurality of electrical components into a single circuit board mounted upon a moving pallet. The pallet carried the board from station to station and a component was inserted at each station. The removal from the pallet of the single circuit board was relatively easy in that each board of a production run was identical in size, shape, and had the same components inserted therein.

At the present time manufacturers of electrical equipment desire to insert selected components into boards of smaller dimensions than heretofore used. These boards may be of a width sufficient to support no more than one row of components and of different lengths. By modifying the pallet previously used for carrying the large unitary board through a series of automatic inserting machines, a manufacturer is now able to insert components, as desired, into strip boards of various lengths. The use of the smaller units, while making the manufacturer's design of the finished electrical product more versatile, presents new problems in the unloading and continual segregation of the strip boards. It is to be noted that these boards are of various lengths and contain a plurality of components which may differ from strip to strip.

It is known in the art that automtic mechanism is available for simultaneous transfer of a plurality of articles. However, these apparati are generally usable only upon articles which are very similar, and indeed, in many cases, necessarily, identical in size, shape, and weight. Further, in the article transfer, systems known in the art, there has been no need for maintaining the various articles in their relative positions. The most that was required was a maintenance of the general orientation of the articles, i.e. topside up, etc.

SUMMARY OF THE INVENTION

It is an object of the present invention to provide an improved automatic article transfer system which will move a plurality of dissimilar articles from one position to another while maintaining their relative positions.

It is a further object of this invention to provide an improved automatic article transfer system which is capable of handling a plurality of articles of different sizes.

It is yet another object of this invention to provide an article transfer system designed for use with a multi-station conveyor assembly system and which is adapted to transfer a plurality of articles of different lengths from the assembly system to a distant unloading station.

One of the features of this invention resides in an unloader which automatically removes all of the component bearing strips from the pallet irrespective of the length of the strips or the number of strips supported by the pallet.

Yet another feature of this invention is in a pallet adapted to give secure support to each of the component receiving strips irrespective of the individual length.

In accordance with a further feature of this invention, the strips are accurately placed within the pallet and the pallet is accurately located with respect to the unloading system enabling a rapid and trouble free unloading of each pallet.

It will be understood that the particular machine embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

The above and other features of the invention including various novel details of construction and combinations of parts will now be more particularly described with reference to the accompanying drawings and pointed out in the claims.

FIG. 1 is a plan view of the unloading apparatus;
FIG. 2 is a plan view of a portion of a modified pallet with the top of the strips removed to expose details of the pallet.

DESCRIPTION OF THE PREFERRED EMBODIMENTS

Figure 4:
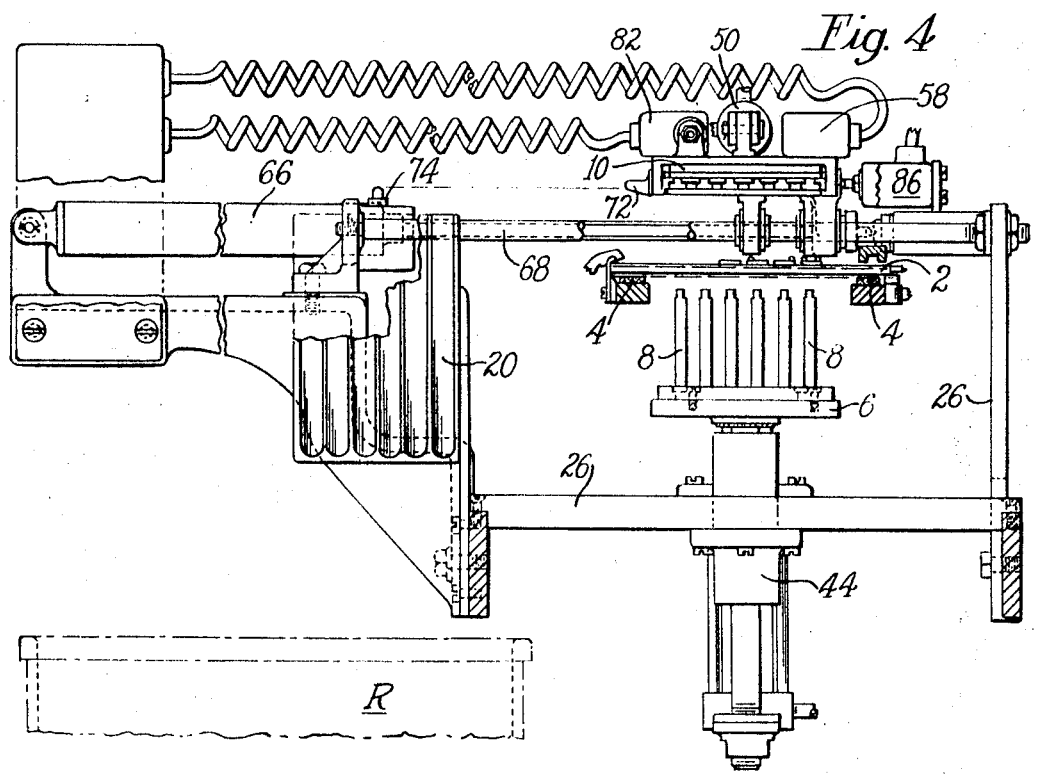
FIG. 4 is a sectional view taken along line IV—IV of FIG. 3.
Figure 5:
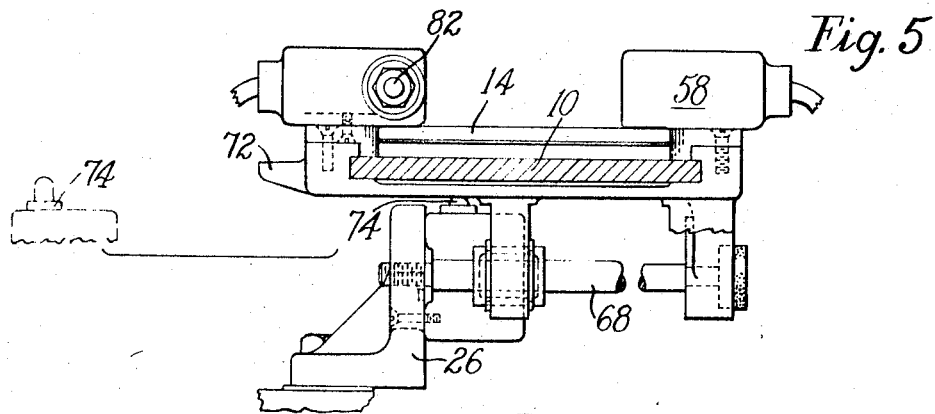
FIG. 5 is a section through the finger slide.
Figure 6:
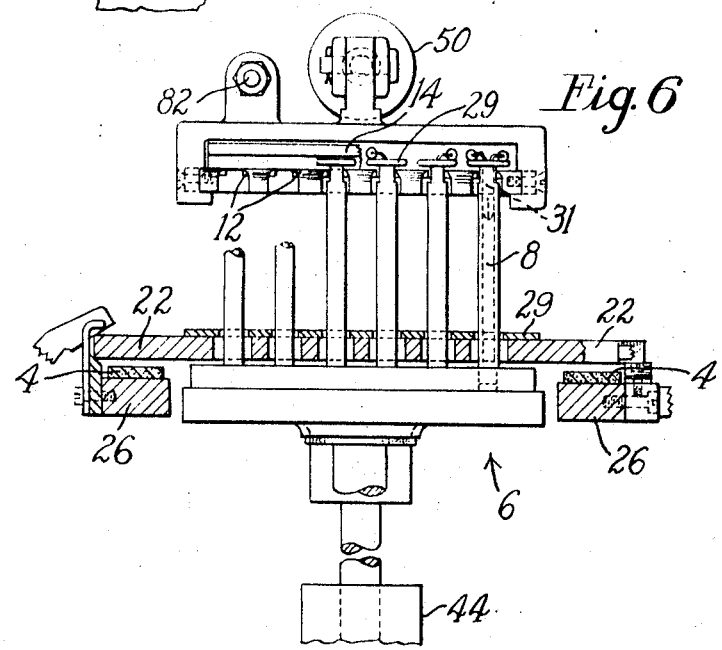
FIG. 6 is a section through the pallet during the component removing operation.

As seen in FIG. 1, a plurality of pallets 2 are carried in the direction of the arrow by a pair of conveying belts 4 through a plurality of assembly stations (not shown) to an unloading station U. At the unloading station U the pallet is locked in position by means more fully descrbied in the above noted patent to Dorosz et al. After the pallet is locked in position, a lifting apparatus 6 (FIGS. 4 and 6) with upwardly extending open ended tubes 8 lifts the elements from the pallet 2 and holds them above the pallet while a horizontally movable finger slide 10 passes its fingers 12 between the upwardly extending tubes 8 of the lifting apparatus 6 to a position where they underlie all of the elements (phantom lines of FIG. 1). When the finger slide 10 is in the outermost position (shown in phantom in FIG. 1) the lifting apparatus 6 returns to its lowermost position leaving the elements supported by the fingers 12 of the slide 10. When the lifting apparatus 6 has reached the lowermost position the finger slide 10 moves transversely of the belt movement, to the left in FIG. 1, carrying the elements to a position distant from the originating pallet. At this point the finger slide 10 is returned to its unextended position and the elements are stripped from the fingers by a stripper bar 14 which fixedly overlies the finger slide 10. In the illustrative apparatus the elements are dropped into a multi-channel slideway 20 which keeps the elements separate in the same relative positions which they had when on the pallet. The finger slide 10 then returns to its original position above the travelling belts 4, ready to begin another cycle. It is to be noted that for simplicity of illustration the elements fall into a common receptacle R but it is obvious that this could be replaced by a multi-compartment bin or a multiplicity of conveyor belts.

THE PALLET

Figure 3:
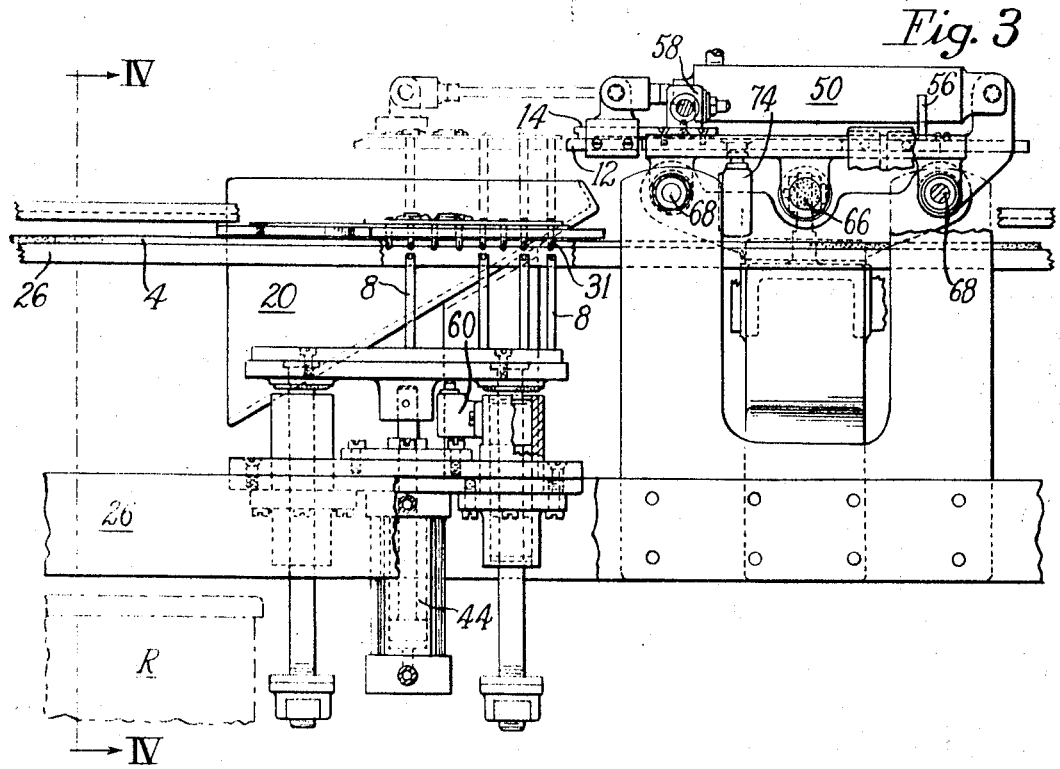
FIG. 3 is an elevational view of the unloading apparatus as viewed from the left of FIG. 1.

As can be seen in FIGS. 1 and 2, the pallet generally designated 2 comprises an exterior frame 22 of rectangular configuration having a lug 24 extending from one of the outer edges. The frame 22 is of such a dimension that a pair of the parallel side portions ride upon the belts 4 generally between the edges of a frame 26 of the conveyor described in the patent to Dorosz et al. The lug 24 extends beyond the frame work 26 for purposes to be later described. Whereas this pallet frame 22 was originally designed to hold in position a single wiring board to receive electrical components it has been modified by the addition of a supporting plate 28 to carry narrow strip boards 29. The strip boards are of varying lengths and are designed to receive a multiplicity of components. The electrical components are automatically inserted into pre-formed holes in the strip boards and it follows that each strip board 29 must be accurately located with respect to the conveying pallet frame 22 to assure an error free insert. The supporting plate 28 which is rigidly fastened to the pallet frame 22 is designed to interchangeably support strip boards 29 adapted to receive components the leads of which are inserted into the receiving holes. The receiving holes have downwardly extending lead receiving terminals 31 (FIGS. 3 and 6) with the center distance between holes varying between 0.300" to 0.344" depending upon the size of component to be used. This range of sizes is easily handled by the mechanism with consistent accuracy. The accuracy of location is accomplished by providing a series of locating holes 30 passing through cover plate 28 upon one end of the modified pallet and at a fixed distance from the edge of plate 28. These holes assure consistent location of the strips when the depending lead receiving terminal 31 is placed therein. Along the line parallel to the line of travel of the pallet through the machine is a series of slots 32 having one or more necks 34 which engage opposite sides of appropriate terminals 31 and assure that the strips lie in parallel relationship.

UNLOADING MECHANISM

The subject matter of this invention as shown in the illustrative apparatus, is used in a completely automated component inserting machine having many stations. In order to prevent errors in insertion and thus insuring a consistent product, the apparatus is designed to perform the multiplicity of operations simultaneously, the failure of any one of the operations stopping the entire apparatus. The pallets 2, each of which contains on an outer edge a lug 24, move from station to station along the conveyor belt and, by the inter-action of the lug 24 with a locking-switching mechanism at each station, the inserting mechanism or the unloading apparatus, the fact that the respective pallets are positioned for the appropriate operation at that station, see FIG. 1. As more completely described in the above noted patent to Dorosz et al., the lug 24 carried by the pallet 2 moves into the switching mechanism 40 causing a lever 42 to pivot locking the pallet in position and closing the circuit of the switch. When the circuit is closed at each of the operating stations, the entire operating mechanism is then free to perform the operation at each station. In most cases the operation will consist of inserting a single component into the proper position. However, the operation which will be presently described is that of removing a plurality of strips which have had the components previously inserted.

When the locking switch 40 and all similar switches at the inserting stations have completed their circuits, a fluid motor 44 mounted upon the frame 26 (FIG. 4) of the conveyor system and directly connected to the lifting apparatus 6 is actuated. As fluid enters the motor 44 the lifting apparatus 6 moves upwardly toward the now stationary pallet, the upwardly extending tubes 8 surround the downwardly depending lead receiving terminals 31 of the strip boards 29 and continue to move upwardly until they abut the lowermost surface of the strip boards 29 and then lift the strip boards until they are free of the pallet. When the depending terminals 31 of the strip boards 29 are above the pallet they are in proper position for the next operation (see FIG. 6). The lifting apparatus 6 has a lug 46 (FIG. 1) extending from the rearwardmost edge which actuates a switch 48 upon reaching the top of its stroke when the terminals are above the pallet.

Figure 7:
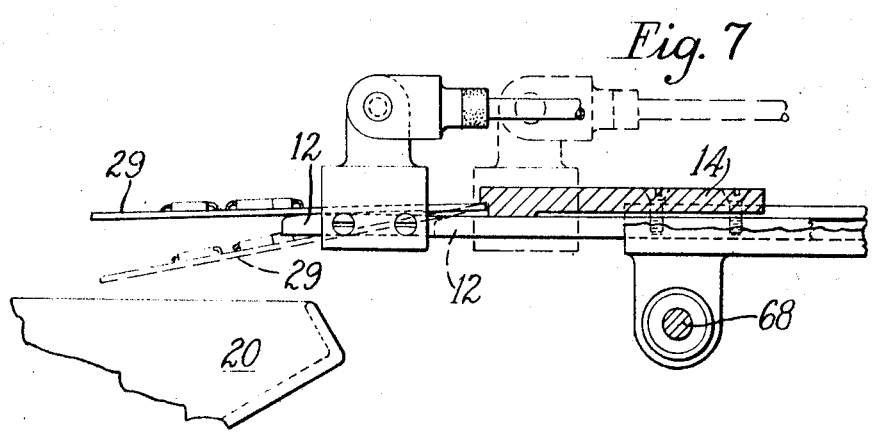
FIG. 7 is a view showing the working relation of the unloading elements during the final step of the unloading operation.

The closing of the circuit by the switch 38 actuates a fluid motor 50 which moves the finger slide 10 horizontally to a position in which the fingers 12 extend between the upwardly extending tubes 8 of the lifting apparatus 6. It is to be noted that the fingers 12 are of such dimensions that they pass readily between the tubes 8. The fingers 12 are close enough to support all of the component strip boards 29 which were originally in the the pallet 2 by the correlation between the margins of the strip boards 29 and the fingers 12. Mounted upon the rear portion of the finger slide 10 is an upwardly extending lug 56 (FIG. 1) which contacts a switch 58 when the fingers 12 underlie the component strips, i.e. when the fingers 12 are extended to the outermost position. The closing of the circuit by the switch 58 causes the motor 44 to vent allowing the lift mechanism 6 to return to its lowermost position. When the lift mechanism 6 reaches its lowermost position it actuates a switch 60 (see FIG. 3) to close a circuit which in turn actuates a motor 66 which moves the finger slide, the component strips, and the motor 50 to a position where the component strips do not overlie the belt 4. The finger slide 10 moves while in its extended position and is supported and guided in this movement by means of a pair of parallel rods 68 (see FIG. 1). When the motor 66 has pulled the finger slide 10 to the most remote position from the conveyor belts 4 a lug 72 (FIGS. 1 and 4) extending from the base of the finger slide contacts a switch 74 completing a circuit and reversing the operation of the motor 50 which pulls the previously extended fingers 12 to their retracted positions. As the fingers are retracted the component strips are stripped from between the fingers by the stripper bar 14 which overlies the fingers 12 in such a fashion that the component strips can not pass thereby. As can be seen in FIG. 7, the component strips 29 which are no longer supported by the fingers 12 are dropped into the multislide compartment 20 from which they will either be handled in such a manner that they will remain segregated or as shown in the illustrative apparatus, let drop into a common receptacle R.

The retraction of the finger slide 10 causes a lug 80 extending upwardly from the slide 10 to contact a switch 82. The closing of the switch 82 reverses the motor 66 returning the finger slide mechanism to a position overlying the belts 4.

When the finger slide mechanism has reached the position overlying the belts and is in position for another unloading operation, the switches 84 and 86 are closed, releasing the locked pallet and indicating to the remainder of the system that the unloading station is free to accommodate another pallet.

Having thus described my invention, what I claim as new and desire to secure by Letters Patent of the United States is:

1. In a multi-station electronic component assembly apparatus comprising an elongated frame, means for conveying a pallet along the frame and a plurality of working stations adjacent the conveying means for sequentially performing electronic component inserting operations upon a plurality of discrete terminal strips carried in parallel relationship by the pallet, means for fixedly locating the pallet with respect to the frame in an unloading station, an automatic unloading means at said station for simultanously removing all of the discrete strips from the pallet comprising means mounted upon the frame below the pallet and movable vertically through the pallets for lifting each of the strips simultaneously and separately therefrom, means mounted upon the frame above the conveying means for horizontal multi-directional movement to receive the discrete strips from the lifting means and to carry them to a point distant from the conveying means where the strips are simultaneously released for further independent movement.

2. Apparatus as in claim 1 wherein the means for simultaneously lifting the strips comprises a vertically reciprocable plate having a plurality of tubular members extending upwardly from the plate generally parallel to the movement of the plate, said members being disposed respectively, to encircle a lead-receiving terminal of the strips.

References Cited

UNITED STATES PATENTS

| | | | |
|---|---|---|---|
| 2,386,076 | 10/1945 | Taylor et al. | 214—310 |
| 2,772,416 | 12/1965 | Dorosz et al. | 198—21 X |
| 3,269,565 | 8/1966 | Kemp | 314—310 X |

HUGO O. SCHULZ, Primary Examiner

U.S. Cl. X.R.

29—203